United States Patent
Stählin et al.

(10) Patent No.: US 9,310,210 B2
(45) Date of Patent: Apr. 12, 2016

(54) VERIFICATION OF DIGITAL MAPS

(75) Inventors: Ulrich Stählin, Eschborn (DE); Otmar Schreiner, Griesheim (DE); Andreas Kircher, Darmstadt (DE); Enno Kelling, Eschborn (DE); Matthias Schorn, Mühltal (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 974 days.

(21) Appl. No.: 12/740,173

(22) PCT Filed: Oct. 28, 2008

(86) PCT No.: PCT/EP2008/064578
§ 371 (c)(1),
(2), (4) Date: Apr. 28, 2010

(87) PCT Pub. No.: WO2009/056533
PCT Pub. Date: May 7, 2009

(65) Prior Publication Data
US 2010/0241354 A1    Sep. 23, 2010

(30) Foreign Application Priority Data

| Nov. 2, 2007 | (DE) | 10 2007 052 892 |
| Oct. 22, 2008 | (DE) | 10 2008 043 061 |
| Oct. 28, 2008 | (DE) | 10 2008 053 531 |

(51) Int. Cl.
*G01C 21/32* (2006.01)
*B60W 40/02* (2006.01)
*G01C 21/30* (2006.01)
*H04W 4/04* (2009.01)
*H04L 29/08* (2006.01)

(52) U.S. Cl.
CPC ........... *G01C 21/32* (2013.01); *B60W 40/02* (2013.01); *G01C 21/30* (2013.01); *H04L 67/12* (2013.01); *H04W 4/046* (2013.01); *B60W 2420/52* (2013.01)

(58) Field of Classification Search
None
See application file for complete search history.

(56) References Cited

U.S. PATENT DOCUMENTS

| 5,883,586 | A * | 3/1999 | Tran et al. ................... 340/945 |
| 2003/0125871 | A1* | 7/2003 | Cherveny et al. ............ 701/208 |
| 2003/0137887 | A1* | 7/2003 | Nakabe et al. ................ 365/200 |
| 2003/0154355 | A1* | 8/2003 | Fernandez .................... 711/163 |
| 2005/0234637 | A1 | 10/2005 | Obradovich et al. |
| 2005/0273257 | A1 | 12/2005 | Hager et al. |
| 2007/0250263 | A1* | 10/2007 | Yamada ....................... 701/207 |
| 2007/0299606 | A1 | 12/2007 | Fujimoto |

FOREIGN PATENT DOCUMENTS

| DE | 101 01 982 A1 | 7/2002 |
| DE | 103 37 631 A1 | 3/2005 |
| DE | 103 37 634 A1 | 3/2005 |
| DE | 10 2004 010 197 A1 | 9/2005 |
| DE | 10 2007 003 147 A1 | 9/2007 |
| EP | 1 116 173 B1 | 7/2001 |
| JP | 2007225498 A * | 9/2007 |

* cited by examiner

*Primary Examiner* — Ryan Zeender
*Assistant Examiner* — Denisse Ortiz Roman
(74) *Attorney, Agent, or Firm* — RatnerPrestia

(57) ABSTRACT

An assessment module for assessing data from a digital map for a vehicle. The assessment is made on the basis of a piece of dedicated map quality information and measurement data from an ambient sensor system in the vehicle. The connected driver assistance systems and safety systems in the vehicle use the digital map data on the basis of the assessment.

14 Claims, 2 Drawing Sheets

VERIFICATION OF DIGITAL MAPS

CROSS REFERENCE TO RELATED APPLICATIONS

This application is the U.S. national phase application of PCT International Application No. PCT/EP2008/064578, filed Oct. 28, 2008, which claims priority to German Patent Application No. 10 2007 052 892.4, filed Nov. 2, 2007, German Patent Application No. 10 2008 043 061.7, filed Oct. 22, 2008, and German Patent Application No. 10 2008 053 531.1, filed Oct. 28, 2008, the contents of such applications being incorporated by reference herein.

FIELD OF THE INVENTION

The invention relates to the use of digital maps in vehicles. In particular, the invention relates to an assessment module for assessing data from a digital map, a driver assistance system for a vehicle having such an assessment module, a safety system for a vehicle having such an assessment module, a vehicle having an assessment module, a method for assessing data from a digital map for a vehicle, a program element and a computer-readable medium.

BACKGROUND OF THE INVENTION

Today's navigation appliances use digital maps. The navigation appliances are installed in the vehicle permanently or can be fitted in the vehicle as mobile units.

When digital map data are used for driver assistance systems or safety systems, for safety reasons these systems assume that the quality of the digital map data is low. In many cases, the full potential of the digital map data is not completely exhausted.

SUMMARY OF THE INVENTION

It is an object of the invention to improve the use of digital map data in vehicles and particularly for driver assistance systems and safety systems.

The invention specifies an assessment module for assessing data from a digital map for a vehicle, a driver assistance system, a safety system, a vehicle, a method, a program element and a computer-readable medium.

The exemplary embodiments described relate in equal measure to the assessment module, the driver assistance system, the safety system, the vehicle, the method, the program element and the computer-readable medium. In other words, the features cited below for the assessment module, the driver assistance system, the safety system or the vehicle, for example can also be implemented in the method, the program element or the computer-readable medium, and vice versa.

In line with one exemplary embodiment of the invention, an assessment module for assessing data from a digital map for a vehicle is specified which has a computation unit and an interface. The computation unit is used to accept data from the digital map and to perform the assessment of the data on the basis of a piece of dedicated map quality information and/or on the basis of measurement data from an ambient sensor system in the vehicle. The interface is designed to transfer the assessment to a driver assistance system and/or to a safety system in the vehicle, wherein the driver assistance system and/or the safety system uses data from the digital map on the basis of the assessment. In other words, the computation unit can verify or validate the digital map data or the overall digital map in the vehicle. This assessment can be made either on the basis of dedicated map quality features or on the basis of sensor data or on the basis of a combination of quality features and sensor data.

The result of the assessment is then transferred via the interface to the driver assistance system and/or a safety system in the vehicle. The system can then use the assessment to decide upon the extent to which it wishes to use the digital map data. If the result of the assessment has turned out to be very positive, for example, the driver assistance system and/or the safety system can rely on the relevant data from the digital map relatively greatly. If the result of the assessment has turned out to be relatively poor (because the digital map is outdated or is inaccurate in this specific location, for example), on the other hand, then the information from the digital map is used for driver assistance or safety control only to a small extent.

The term "digital maps" is also intended to be understood to mean maps for advanced driver assistance systems (ADAS), without any navigation taking place.

By way of example, the vehicle is a motor vehicle, such as a car, bus or heavy goods vehicle, or else is also a rail vehicle, a ship, an aircraft, such as a helicopter or airplane, or is a bicycle, for example.

In addition, it should be pointed out that, within the context of the present invention, GPS is representative of all global navigation satellite systems (GNSSs), such as GPS, Galileo, GLONASS (Russia), Compass (China), IRNSS (India), etc.

At this juncture, it should also be pointed out that the position finding for the vehicle can also be performed using cell positioning. This is particularly appropriate when GSM or UMTS networks are used.

In line with a further exemplary embodiment of the invention, the assessment of the data from the digital map comprises the determination of a quality and/or a validity for the data.

The use of map data for driver assistance systems is at present specified and defined by the ADASIS forum or in the MAPS & ADAS project. By assessing the quality of the data, it is possible for said data to be used to a greater extent than previously for driver assistance systems or safety systems. To date, such systems have always had to assume that the quality of the data is low.

In line with a further exemplary embodiment of the invention, the assessment module is designed to determine the validity of the data on the basis of the measurement data from the ambient sensor system.

The measurement data which are measured by the ambient sensors in the ambient sensor system are thus used to validate the data. This validation may be upstream or downstream of further assessment steps. By way of example, the validation can take place in a fusion module which is downstream of the computation unit for assessing the digital map. Said fusion module may also be accommodated in the same computation unit (processor). It is also possible for validation to take place first, with this then being followed by assessment of the data.

In this context, validation is understood to mean that it is established whether the map data match the current position and surroundings of the vehicle. In other words, this means that it is established whether the vehicle is, by way of example, actually on the road indicated by the digital map. By contrast, the assessment involves establishing how accurate the map information actually is.

In line with a further exemplary embodiment of the invention, the dedicated map quality information has a piece of information selected from the group comprising a piece of timestamp information, a piece of information regarding a measurement accuracy with which the relevant data have been recorded, a piece of information regarding a discrepancy between a measured position for the vehicle and a map-matching position, a piece of information regarding a density of the data and a piece of information regarding a type of the data.

In line with a further exemplary embodiment of the invention, the assessment of the data comprises authentication of the data. By way of example, such authentication can be performed by reading an appropriate certificate with which the digital map has been provided.

In line with a further exemplary embodiment of the invention, the assessment of the data comprises determination of a currentness of the data, wherein the assessment module is designed to determine the currentness of the data using a return channel to a control center. By way of example, the control center is a service provider.

In line with a further exemplary embodiment of the invention, the measurement data from the ambient sensor system which are used to assess the data are selected from the group comprising information regarding a traffic lane, a road sign, a building and vegetation.

Thus, the ambient sensor or the ambient sensors observe the surroundings of the vehicle. The captured measurement data can then be used to establish whether the digital map or the digital map detail used matches the surroundings, that is to say is valid.

In line with a further exemplary embodiment of the invention, the assessment module is designed to assess data from a digital map on a mobile appliance. The assessment and the assessed digital map data are then transferred to the driver assistance system and/or the safety system in the vehicle. This system can then use the data from the digital map on the mobile appliance on the basis of the assessment.

In line with a further exemplary embodiment of the invention, the data transferred via the interface to the driver assistance system and/or the safety system contain not only the assessment but also the relevant measured position data for the vehicle, including relevant attributes.

In line with a further exemplary embodiment of the invention, a driver assistance system for a vehicle is specified which has an assessment module as described above.

In line with a further exemplary embodiment of the invention, a safety system for a vehicle having an assessment module as described above is specified.

In line with a further exemplary embodiment of the invention, a vehicle having an assessment module as described above is specified. In line with a further exemplary embodiment of the invention, a method for assessing data from a digital map for a vehicle is specified in which data from the digital map are accepted by a computation unit. Next, an assessment of the data is performed on the basis of a piece of dedicated map quality information and/or on the basis of measurement data from an ambient sensor system in the vehicle. In addition, the assessment is transferred, possibly together with the assessed digital map data, to a driver assistance system and/or a safety system in the vehicle, which uses the data from the digital map on the basis of the assessment.

At this juncture, it should be pointed out that the driver assistance system or the safety system is thus in a form such that it can take the assessment as a basis for determining the extent to which the digital map data are intended to be used for performing the relevant assistance functions or safety functions in the vehicle.

In line with a further exemplary embodiment of the invention, a program element is specified which, when executed on a processor, instructs the processor to perform the steps described above.

In this case, the program element may be part of a piece of software, for example, which is stored on a processor in the vehicle management. In this context, the processor may likewise be the subject matter of the invention. In addition, this exemplary embodiment of the invention comprises a computer program element which uses the invention right from the start and also a computer program element which, by means of an update, prompts an existing program to use the invention.

In line with a further exemplary embodiment of the invention, a computer-readable medium is specified which stores a program element which, when executed on a processor, instructs the processor to perform the steps described above.

The text below describes exemplary embodiments of the invention with reference to the figures.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
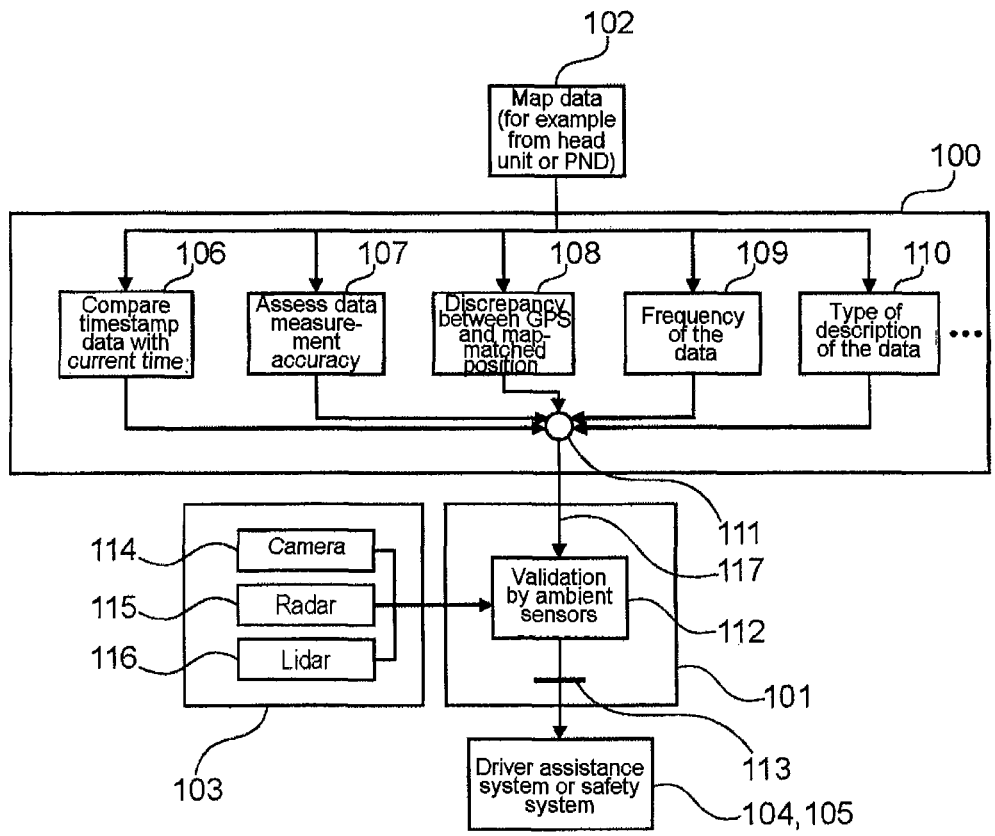
FIG. 1 shows an assessment module and a driver assistance system or safety system based on an exemplary embodiment of the invention.

The illustrations in the figures are schematic and thus not to scale.

In the description of the figures which follows, the same reference numerals are used for the same or similar elements.

FIG. 1 shows an assessment module for assessing data from a digital map for a vehicle, and also a driver assistance system or safety system 104, 105 connected thereto and an appropriate ambient sensor system 103.

The assessment module has two submodules 100, 101. The first submodule 100 is supplied with digital map data from, by way of example, a head unit 102 in what is known as an Infotainment system or a PND 102, that is to say a primary navigation system with a screen. These digital map data are then sent to each of the subunits 106 to 110. It is also possible for further subunits to be provided or for one or more of the subunits to be dispensed with.

The first subunit 106 sets up a comparison between timestamp data from the digital map data and the current time. The second subunit 107 assesses the measurement accuracy of the digital map data. The third subunit 108 establishes a discrepancy between a measured GPS position for the vehicle and a map-matching position for the vehicle. The fourth subunit 109 measures the frequency or density of the digital map data, and the fifth subunit 110 establishes the type of the description of the data.

The results from the calculations by the subunits are supplied to a first computation unit 111, which then takes these data as a basis for performing a comprehensive assessment of the digital map data, in particular the digital map data which correspond to the current position of the vehicle.

The relevant assessment result is then transferred via the data line 117 to the second submodule 101, which is a fusion module, for example, which validates the digital map data with measurement data from the ambient sensor system 103.

At this juncture, it should be pointed out that the data transmission between the individual components can take place either by wire or else wirelessly.

By way of example, the ambient sensor system 103 has a camera 114, a radar sensor 115 and/or a Lidar sensor 116. It is also possible to use ESP sensors, which can help to determine the current position of the vehicle (for example by detecting special features of the road, for example driving over a railway sleeper or a sharp bend).

The measured ambient data are likewise transferred to the computation unit 112 of the fusion module 101. The computation unit 112 may also be combined with the computation unit 111, which means that it is possible to avoid data interchange via the data line 117.

In addition, an interface 113 is provided which can be used to transfer the assessment in the form of a final result, possibly together with the relevant digital map data, to a driver assistance system or a safety system 104, 105.

If digital map data are used for driver assistance systems or safety systems, these systems are hitherto unable to make a statement about the quality or validity of the map information. However, this is necessary in order to support decisions or actions by the systems, such as an autonomous braking or steering action, with the map information for functional safety purposes.

This is the starting point for the invention. The assessment module (which may be made up of two submodules 100, 101 or else of a combined overall module) assesses the quality of the digital map data before they are forwarded to the driver assistance systems or safety systems. Such an assessment module can also be referred to as a "safety map module".

The following quality features can be used in this context:
  (a) The currentness of the map information. For this, every piece of information in the map is provided with a timestamp which states when said piece of information was recorded. The older the data, the lower the quality of the data.
  (b) Every position in the map also contains a piece of information about the measurement accuracy with which these data have been recorded (e.g. the measurement accuracy of the (D)GPS hardware used). The better this measurement accuracy, the higher the assessment of the quality of the data.
  (c) About the discrepancy between the GPS position of the vehicle and the map-matching position determined by the navigation system. The greater this interval, the lower the assessment of the quality of the data.
  (d) About the frequency of the data. If a large number of dots and line segments or other elements at a short interval are used to describe a section, the quality can be assessed more highly than when fewer dots and line segments or further elements are used to describe the section. This also applies to the attributes associated with said dots, sections or other elements.
  (e) About the type of the description. If a section is described as straight, for example, the quality can be regarded as lower than if polynomials, splines, etc., are used.

To ensure that the information in the map is authentic, it can be provided with certificates or confirmed using other methods of authentication. The type of certificate or authentication can also be used to assess the quality or the reliability of the map data. Thus, certificates or authentication methods from an official office (and hence from third parties) receive a higher quality assessment than certificates from manufacturers or from individuals.

The currentness of the data can also be assessed in real time using a return channel to a service provider. In this case, it is possible to check the currentness of the data. Thus, even data with an old timestamp may still be current if still no changes have occurred.

The authentication can also be used to check whether a map is current with the manufacturer. This may be important if a mobile navigation terminal uploads the map data to a driver assistance system. The authentication certificates may either be present in the vehicle or be obtained from an office external to the vehicle, e.g. via a service provider.

The described method can also be used to assess dynamic information, such as tailback information.

The quality assessment described hitherto is based purely on data from the map itself. Subsequently, or prior to this assessment, validation by means of ambient sensors can also take place. In this regard, a few examples will be mentioned below:
  (a) A camera can be used to identify the traffic lanes and to compare the profile and number thereof with the map data.
  (b) A camera can be used to identify traffic signs, traffic lights or other road signs and to compare them with the entries in the map.
  (c) A camera can be used to detect information about bridges, buildings at the edge of the road, other buildings, vegetation (trees, forest, etc.). This information can be compared with the additional information in the map in order to assess the currentness of said map.
  (d) A radar or Lidar sensor can be used to identify guardrails and other articles. This information can likewise be compared with the map data.

The methods described here can also be used to assess map data from mobile appliances and hence possibly to use said data for driver assistance systems or safety systems.

According to the quality assessment, it is then possible for the driver assistance system and/or the safety system to resort to the map data to a greater or lesser extent. Thus, an ACC system (Adaptive Cruise Control System) can base the rule strategy on these data very highly if the quality assessment of the map data is good. If the quality assessment is poor, on the other hand, the ACC relies almost exclusively on the ambient sensor (e.g. Radar).

The two methods described (quality assessment using dedicated map data and using ambient sensors) can also be used individually in this context and do not necessarily require each other. The flow which is shown in FIG. 1 is used as a basis for the following exemplary embodiment.

In the head unit 102 with the navigation system, the map data are stored in a database. The timestamp and the measurement accuracy are linked to the respective data by means of references in this case and are therefore a kind of "attribute" or "meta-attribute" for said data. On the basis of GPS data, the data record associated with the current position is loaded from the database and is provided to the module 100 with the computation unit 111 via a CAN bus, for example. This module is subsequently called the "Safety Map Module" (SMM).

The SMM now assesses these data and uses the variables indicated above (such as timestamp, measurement accuracy, etc.) and certificates to check the authenticity of the map data. Next, an overall assessment is ascertained from the individual quality assessments. The data record thus comprises the actual position data, including the attributes, the quality assessments and the overall assessment.

These data are then transferred to a fusion module 101 by CAN bus 117. This fusion module compares the map data with information from ambient sensors 114, 115, 116, as already explained above. These validated data are then used to create the "e-Horizon", which is then provided to the individual driver assistance and system modules 104, 105 by CAN bus via the interface 113.

In this case, the SMM and the fusion module may also be integrated on a computation unit, which dispenses with the CAN bus link 117.

It is thus possible to assess the quality of map data using dedicated map quality information. In addition, the map data, the quality information and the currentness can be authenticated by means of certificates or other authentication mechanisms. Furthermore, the reliability of the data can be assessed on the basis of the type of the authentication method, and the map data can be validated by means of an ambient sensor system. In addition, it is also possible to use map data from mobile appliances by means of this quality assessment.

Figure 2:
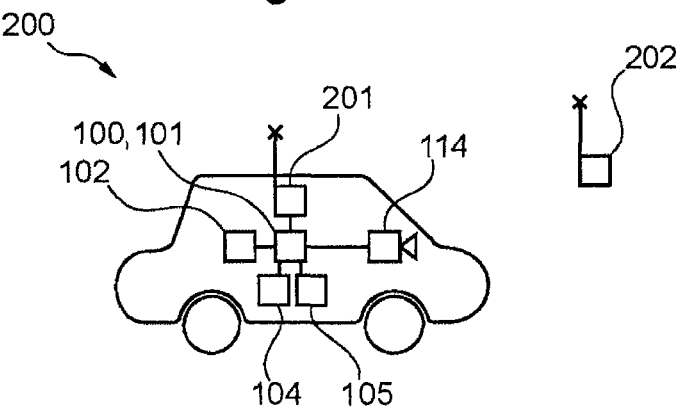
FIG. 2 shows a vehicle with a control center based on an exemplary embodiment of the invention.

FIG. 2 shows a vehicle 200 based on an exemplary embodiment of the invention and a control center 202 communicating therewith, for example in the form of a service provider.

The vehicle 200 has the assessment modules 100, 101, which are combined to form an overall module. In addition, a communication apparatus 201 is provided which is provided for the purpose of data interchange via the control center 202. In addition, the vehicle 200 has a camera 114 or one or more other ambient sensors, which can be used to observe the surroundings. The module 100, 101 assesses the digital map data from the memory 102 and forwards the assessment to the driver assistance system 104 and the safety system 105.

Figure 3:
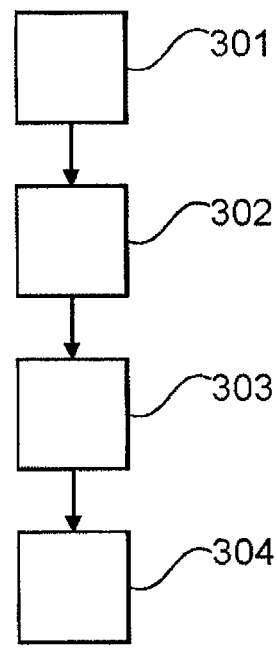
FIG. 3 shows a flowchart of a method based on an exemplary embodiment of the invention.

FIG. 3 shows a flowchart for a method, in which step 301 involves data from a digital map being accepted by a computation unit. In step 302, said computation unit assesses the data on the basis of dedicated map quality information. In step 303, there is a further assessment of the data on the basis of measurement data from ambient sensors, and, in step 304, the final result of the assessment is transferred to a safety system and/or a driver assistance system.

Figure 4:
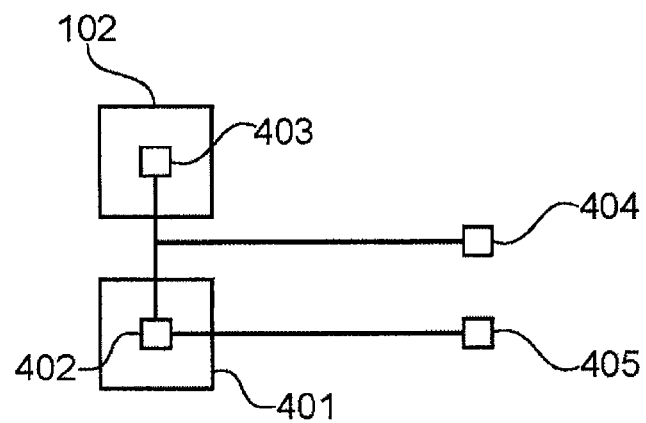
FIG. 4 shows an exemplary embodiment of various information levels in a digital map.

The following aspects are clarified particularly in FIG. 4.

Digital maps are often stored on various "levels" in a database. These levels correspond to different resolutions or different details (roads, signs, etc.). To be able to use said data in a controller and hence in a driver assistance system or the engine controller, for example, the "GeoHorizon" or "eHorizon" is used. This conveys information to the systems about the appearance of the road or the section ahead of the vehicle.

Safety applications (driver assistance systems or other safety systems) require current and reliable map data. However, not all the data elements need to meet the same demands in this case. The demands regarding the different levels of the map data are therefore also different.

To date, all the data have been stored in a database. However, since the demands are different, it is appropriate to store the different levels in different databases and hence also in different controllers, even in part. These different databases and different controllers then also comply with different safety levels. By way of example, data for safety applications, such as bend radii, could be stored in a controller with a high safety level, for example SIL3 or SIL4, and navigation-related data, such as road names, could be stored in a less safe controller complying with a safety level SIL0 or SIL1, for example.

It is also possible for all the data to be stored in the same memory, but with the memory being separated by means of a memory management unit (MMU) into a safety-related area and a non-safety-related area.

The different levels or memories or memory areas can then also be updated in different ways. By way of example, it is thus possible to update dynamic data by TMC, wherein data which almost never change (the geological topology) are read in by means of DVDs and other data are transmitted by means of radio links.

The different levels can be split on the basis of the quality levels to be met for the respective data. Thus, one level combines the data on which the same quality demands are made by the applications. This quality level then also stipulates how often the data need to be updated.

The accuracy of the linking of the different levels can be made dependent on the safety demands. Thus, in the case of safety-critical levels, a high level of linking is implemented between the levels, e.g. per element, and, in the case of less safety-critical levels, only per area.

To create the GeoHorizon or eHorizon, it is accordingly possible to use only data which correspond to a certain quality level and/or for which a certain currentness is ensured and/or which come from a controller which has a certain safety level. In this case, it is also possible to ensure separation between consumer data (only of interest for navigation and additional services) and safety data (important for ADAS and/or safety systems), that is to say to implement a type of "Firewall" between said data.

Hence, the ADAS and/or safety systems have all the necessary data by virtue of the GeoHorizon or eHorizon, without unsafe user data (consumer data) being able to result in losses of quality.

A high-quality, protected data level can be used to validate the data on a data level with lower quality. Only the validated data are used for ADAS and/or safety applications. As an example of this:

(a) A high-quality data level (e.g. certified by a government office) contains data relating to road signs.
(b) A data level with lower quality contains data relating to schools, playgrounds, etc.

The sign information (speed restrictions, warnings of playing children, etc.) are now used to validate the data relating to schools and playgrounds. If relatively large discrepancies or inconsistencies arise in this context, the data on the data level with relatively low quality are not used for ADAS and/or safety applications.

By storing the data in different controllers, it is also possible to split the processing and hence provide redundancy, for example.

Splitting the map data according to safety demands allows the function of the map to be provided even when not all the data are available. Thus, a very high overall safety level is achieved without the need for all the data to be stored and processed at a high safety level. This allows costs to be saved.

FIG. 4 shows an exemplary embodiment of various information levels in a digital map and, on the basis thereof, various quality levels, memory locations and update channels.

A safety-related memory 402 in a central controller 401 is used to store all geometric data from a digital map, such as road profiles, etc. A less highly protected memory 403 in the head unit 102 then additionally stores the road names, points of interest, etc.

The eHorizon (represented by Box 405) is provided by the central controller, and this involves only the data from the central controller being used. For the navigation 404, on the other hand, the data from the central controller 401 and the head unit 102 are used.

In line with one exemplary embodiment of the invention, an assessment module is specified which has a first memory area for storing first data from the digital map, wherein the first memory area meets first safety demands. In addition, the assessment module has a second memory area for storing second data from the digital map, wherein the second memory area meets second safety demands, which are different than the first safety demands.

The two memory areas may be arranged on different storage media, or else on the same storage medium, in which case they are separated from one another by an MMU, for example.

At this point, it should be noted that the principle of separate memory areas for digital maps can be used generally. It is not necessary to assess the map data.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. A vehicle system for assessing data from a digital map, and controlling a vehicle, said vehicle system comprising:
   a computation unit including a processor located in the vehicle configured to accept data from the digital map and to perform an assessment of the data by computing a quality of the data based on a plurality of pieces of dedicated map quality information and validating the data based on measurement data from an ambient sensor system in the vehicle;
   a driver assistance system located in the vehicle, the driver assistance system coupled to the processor of the computation unit via a data bus and configured to control the vehicle; and
   an interface located in the vehicle for transferring, via the data bus, the assessment to the driver assistance system which uses at least a portion of both the data from the digital map and the data from the ambient sensor system to control the vehicle:
      based more on the data from the digital map than the data from the ambient sensor system when the transferred assessment via the data bus indicates that the computed quality is greater than or equal to a threshold, and
      based more on the data from the ambient sensor system than the data from the digital map when the transferred assessment via the data bus indicates that the computed quality is less than the threshold.

2. The assessment module as claimed in claim 1, wherein the assessment comprises a determination of a quality and a validity for the data from the digital map.

3. The assessment module as claimed in claim 1, wherein the assessment module is configured to determine the validity of the data from the digital map on a basis of the measurement data from the ambient sensor system.

4. The assessment module as claimed in claim 1, wherein the piece of dedicated map quality information has at least one piece of information selected from a group consisting of a piece of timestamp information, a piece of information regarding a measurement accuracy with which relevant data have been recorded, a piece of information regarding a discrepancy between a measured position for the vehicle and a map-matching position, a piece of information regarding a density of the data, and a piece of information regarding a type of the data.

5. The assessment module as claimed in claim 1, wherein the assessment comprises authentication of the data from the digital map.

6. The assessment module as claimed in claim 1, wherein the assessment of the data from the digital map comprises determination of a currentness of the data from the digital map; wherein the assessment module is configured to determine the currentness of the data from the digital map using a return channel to a control center.

7. The assessment module as claimed in claim 1, wherein the measurement data from the ambient sensor system which are used to assess the data are selected from the group consisting of information regarding a traffic lane, a road sign, a building and vegetation.

8. The assessment module as claimed in claim 1 configured to assess data from a digital map on a mobile appliance, which digital map data is then transferred to a driver assistance system or a safety system in the vehicle, which then uses the data from the digital map on the mobile appliance on the basis of the assessment.

9. The assessment module as claimed in claim 1, wherein the interface transfers measured position data for the vehicle, including attributes to the driver assistance system.

10. The assessment module as claimed in claim 1, further comprising a first memory area for storing first data from the digital map, wherein the first memory area meets first safety demands; and
   a second memory area for storing second data from the digital map, wherein the second memory area meets second safety demands, which are different than the first safety demands.

11. The assessment module as claimed in claim 1, wherein the system in the vehicle is a driver assistance system, and is included in the assessment module.

12. The assessment module as claimed in claim 1, wherein the system in the vehicle is a safety system, and is included in the assessment module.

13. A method for assessing data from a digital map for a vehicle system of a vehicle, and controlling the vehicle, said method comprising the following steps:
   accepting, by a processor located in the vehicle system, data from the digital map;
   assessing, by the processor located in the vehicle system, the data by computing a quality of the data based on a plurality of pieces of dedicated map quality information and validating the data based on measurement data from an ambient sensor system located in the vehicle;
   controlling, by a driver assistance system located in the vehicle and coupled to the processor via a data bus located in the vehicle, the vehicle; and
   transferring, by the processor located in the vehicle system, via the data bus located in the vehicle, the assessment to the driver assistance system which uses at least a portion of both the data from the digital map and data from the ambient sensor system to control the vehicle:
      based more on the data from the digital map than the data from the ambient sensor when the transferred assessment via the data bus indicates that the computed quality is greater than or equal to a threshold, and
      based more on the data from the ambient sensor system than the data from the digital map when the transferred assessment via the data bus indicates that the computed quality is less than the threshold.

14. A non-transitory computer-readable medium which stores a program element which, when executed on a processor located in a vehicle system of a vehicle, instructs the processor to control the vehicle by performing the following steps:
- accept, by the processor located in the vehicle system, data from a digital map;
- perform, by the processor located in the vehicle system, an assessment of the data by computing a quality of the data based on a plurality of pieces of dedicated map quality information and validating the data based on measurement data from the ambient sensor system located in the vehicle;
- controlling, by a driver assistance system located in the vehicle and coupled to the processor via a data bus located in the vehicle, the vehicle; and
- transfer, by the processor located in the vehicle system, via the data bus located in the vehicle, the assessment to the driver assistance system which uses at least a portion of both the data from the digital map and the data from the ambient sensor system to control the vehicle:
    - based more on the data from the digital map than the data from the ambient sensor system when the transferred assessment via the data bus indicates that the computed quality is greater than or equal to a threshold, and
    - based more on the data from the ambient sensor system than the data from the digital map when the transferred assessment via the data bus indicates that the computed quality is less than the threshold.

* * * * *